(12) United States Patent
Humair et al.

(10) Patent No.: US 10,732,572 B2
(45) Date of Patent: Aug. 4, 2020

(54) HOROLOGICAL RIVET

(71) Applicant: ROLEX SA, Geneva (CH)

(72) Inventors: Hervé Humair, Saignelégier (CH);
Matthieu Jobard, Tavannes (CH);
Adrien Nicolet, Bienne (CH)

(73) Assignee: ROLEX SA, Geneva (CH)

( * ) Notice: Subject to any disclaimer, the term of this patent is extended or adjusted under 35 U.S.C. 154(b) by 0 days.

(21) Appl. No.: 15/071,605

(22) Filed: Mar. 16, 2016

(65) Prior Publication Data

US 2016/0274545 A1    Sep. 22, 2016

(30) Foreign Application Priority Data

Mar. 17, 2015   (EP) ..................... 15159493

(51) Int. Cl.
*G04B 31/06* (2006.01)
*G04B 29/04* (2006.01)
*G04G 17/02* (2006.01)
*F16B 19/08* (2006.01)
*G04B 31/00* (2006.01)

(52) U.S. Cl.
CPC .............. *G04B 31/06* (2013.01); *F16B 19/08* (2013.01); *G04B 29/04* (2013.01); *G04B 31/00* (2013.01); *G04G 17/02* (2013.01)

(58) Field of Classification Search
CPC ........ G04B 31/00; G04B 31/06; G04B 29/04; F16B 19/08; F16B 19/1036; F16B 21/02; G04G 17/02
See application file for complete search history.

(56) References Cited

U.S. PATENT DOCUMENTS

| 1,842,460 | A | * | 1/1932 | Poole | .................... | G04C 3/022 |
| | | | | | | 368/317 |
| 2,754,703 | A | * | 7/1956 | Huck | .................... | B21D 39/03 |
| | | | | | | 29/510 |

(Continued)

FOREIGN PATENT DOCUMENTS

| CN | 103945748 A | 7/2014 |
| CN | 203909480 U | 10/2014 |

(Continued)

OTHER PUBLICATIONS

European Search Report and Written Opinion dated Dec. 9, 2015 issued in counterpart European application No. 15159493; w/ English partial translation and partial machine translation (17 pages).

(Continued)

*Primary Examiner* — Sean Kayes
(74) *Attorney, Agent, or Firm* — Seckel IP, PLLC

(57) ABSTRACT

A rivet (1), in particular a horological rivet, comprising:
 a longitudinal axis (10);
 a first part (20), in particular a head (50);
 a second part (30), in particular a body (60),
the first part comprising a first handling element (1a) that is able to mechanically stress the first part, and the second part comprising a second handling element (1b) that is able to mechanically stress the second part, the first and second handling elements being such that they make it possible to apply mechanical actions to the first and the second part, respectively, that cause the first and second parts of the rivet to break, notably to shear.

21 Claims, 5 Drawing Sheets

(56) References Cited

U.S. PATENT DOCUMENTS

| | | | | |
|---|---|---|---|---|
| 3,304,830 | A * | 2/1967 | Shackelford | F16B 39/284 |
| | | | | 411/500 |
| 3,432,214 | A * | 3/1969 | Cashman | F16C 11/02 |
| | | | | 384/292 |
| 3,963,322 | A * | 6/1976 | Gryctko | F16B 31/021 |
| | | | | 439/814 |
| 4,277,841 | A * | 7/1981 | Ogden | G04C 17/0075 |
| | | | | 310/216.096 |
| 6,233,802 | B1 * | 5/2001 | Fulbright | B21J 15/022 |
| | | | | 29/243.519 |
| 7,447,118 | B1 * | 11/2008 | Matos | G04B 37/0033 |
| | | | | 368/10 |
| 8,037,788 | B2 * | 10/2011 | Proper | B25B 13/48 |
| | | | | 210/198.2 |
| 8,317,443 | B2 * | 11/2012 | Stauch | H01R 4/363 |
| | | | | 411/2 |
| 2004/0017735 | A1 | 1/2004 | Kotanagi et al. | |
| 2005/0183260 | A1 * | 8/2005 | Meyer | B64C 1/12 |
| | | | | 29/524.1 |
| 2006/0062650 | A1 * | 3/2006 | Keener | F16B 19/08 |
| | | | | 411/34 |
| 2006/0182512 | A1 * | 8/2006 | Williams | B21J 15/50 |
| | | | | 411/41 |
| 2007/0003389 | A1 | 1/2007 | Jones et al. | |
| 2007/0109916 | A1 | 5/2007 | Bron | |
| 2009/0075526 | A1 * | 3/2009 | King, Jr. | H01R 4/36 |
| | | | | 439/717 |
| 2012/0328388 | A1 * | 12/2012 | Hardt | F16B 31/021 |
| | | | | 411/5 |
| 2013/0216331 | A1 * | 8/2013 | Yang | F16B 19/08 |
| | | | | 411/501 |
| 2013/0223194 | A1 | 8/2013 | Cattin et al. | |
| 2013/0269092 | A1 | 10/2013 | Hand et al. | |
| 2013/0340154 | A1 | 12/2013 | Hand et al. | |
| 2014/0165368 | A1 * | 6/2014 | Cordova | H02G 3/121 |
| | | | | 29/525.11 |
| 2016/0062315 | A1 | 3/2016 | Altenhoven et al. | |
| 2016/0104952 | A1 * | 4/2016 | Beck | H01R 4/366 |
| | | | | 439/814 |

FOREIGN PATENT DOCUMENTS

| | | |
|---|---|---|
| CN | 204003885 U | 12/2014 |
| DE | 102 41 770 A1 | 9/2003 |
| EP | 1 365 295 A2 | 11/2003 |
| EP | 1 691 087 A2 | 8/2006 |
| EP | 1 734 265 A2 | 12/2006 |
| EP | 1785783 A1 | 5/2007 |
| EP | 2 644 909 A1 | 10/2013 |
| JP | 55-8292 Y2 | 2/1980 |
| JP | H05-8489 U | 2/1993 |
| JP | 2000-352407 A | 12/2000 |
| JP | 2003-337185 A | 11/2003 |
| JP | 2006220300 A | 8/2006 |
| JP | 2013-181984 A | 9/2013 |
| WO | 2014/173582 A1 | 10/2014 |

OTHER PUBLICATIONS

Chinese Office action dated Nov. 13, 2018 in counterpart application No. CN 2016101540190; w/English translation (16 pages) (D1, EP1691087A2 and D4, US1,842,460A cited in the Chinese Office Action are not listed in this IDS since they were already listed in the IDS filed Mar. 16, 2016 and in the PTO892 of the Office Action dated Feb. 7, 2018, respectively).

EPO Office action dated Feb. 27, 2019 in counterpart application No. EP16160673.6; w/English machine translation (16 pages) (D1, JPS55-8292Y2, D2, EP1691087A2, D2, JPS55-8292Y2, and D3 (D7), DE10241770A1 cited in the EPO Office Action are not listed in this IDS since they were already listed in the IDS filed Mar. 16, 2016).

Japanese Office Action and Search Report dated Mar. 10, 2020 in counterpart application No. JP2016048119; w/ English machine translation (31 pages) (D5 of the JOA (D2 of the JSR), U.S. Pat. No. 3963322 is not listed in this IDS since it was already cited in the Office Actions dated Jun. 5, 2018 and Sep. 17, 2019; D4 of the JSR, WO2014173582 and D8 of the JSR, JPS55-8292, are lot listed in this IDS since they were already listed in the IDS filed Mar. 16, 2016; D2 of the JOA (D5 of the JSR).

* cited by examiner

US 10,732,572 B2

HOROLOGICAL RIVET

The invention relates to a horological rivet. It also relates to a mechanism comprising such a rivet. It also relates to a timepiece movement comprising such a rivet or such a mechanism. Finally, it relates to a timepiece, in particular a wrist watch, comprising such a rivet, such a mechanism or such a movement. The invention also relates to a tool for removing a rivet. Finally, the invention relates to a method for removing a riveted assembly.

Rivet assemblies are commonly employed in the field of horology, in particular to allow reliable and durable assembly of at least two timepiece components which can be for example in the form of a mobile or a movement blank.

Timepiece rivets are in the form of a component, at least a portion of which is plastically deformable at one of its ends so as to allow the rivet to be secured to at least one timepiece component.

The step of plastic deformation of the rivet is conventionally carried out by way of a suitable tool known as a riveter, the geometry of which is designed so as to match the geometry of the rivet seam, the name given to the plastically deformable portion of the rivet, to that of the bore in the assembled component.

Rivets known from the prior art can be removed by breaking the rivet seam, for example during a step of repairing a timepiece. This step can prove to be particularly difficult and is not without consequences as far as the geometric and esthetic integrity of the components incorporated into a riveted assembly is concerned. This is a real problem in the field of high-end horology, where the requirements in terms of esthetics and geometric tolerances are particularly high.

It can thus prove advantageous, for example during a step of repairing the timepiece, to allow easy removal of the rivet while maintaining the geometric and esthetic integrity of the components incorporated into a riveted assembly.

Solutions involving alternative assemblies to the riveted assemblies exist but do not make it possible to preserve the assembly reliability known from the conventional horological rivet.

The document EP1365295 describes for example a solution involving the assembly of two components by way of a split pin provided with elastically deformable tabs which alone allow mounting and removal of the assembly. While such a solution allows easy removal of the assembly, the rigidity of the assembly can prove insufficient in some application cases, and therefore cannot be considered satisfactory for some applications.

The document WO2014/173582 describes a solution involving the assembly of two components in which the assembly means are separate from the removal means. More particularly, the patent application WO2014/173582 discloses a solution involving the casing of a timepiece movement, employing rivets that are deformable by a thermoforming step so as to ensure a rigid assembly between the movement and the middle of a timepiece. In one specific embodiment, these rivets can be removable. In this scenario, the rivets are produced in one piece with bushings provided with threads so as to allow the bushings to be driven into and out of holes in the middle. Under certain conditions, notably while the watch is being worn, in particular in the event of an impact, there is a risk of the bushings of the rivets being driven out and thus of deterioration of the riveted assembly between the movement and the middle. Therefore, such a solution is not acceptable.

In the general mechanical field, blind rivets (also known as POP rivets registered trademark) are well known for allowing easy and reliable assembly of at least two components. These rivets are made up of a deformable hollow alloy body and a shaft, one end of which is rounded. This type of rivet is positioned using riveting pliers which pull on the shaft, the rounded end of which passes into the body of the rivet in order to produce the rivet joint. When blocking is carried out, the shaft breaks, leaving the rivet in place.

By way of example, the documents EP1734265 and EP2644909 disclose rivet geometries where the heads have shaped portions so as to allow them to be removed. This involves exerting on the head of the rivet an action which it is not possible to exert on a timepiece rivet given the environment of the timepiece mechanism. Specifically, it is not conceivable to exert impacts, to machine the head of the rivet or to cut it with the aid of pliers in a timepiece movement environment. Such solutions are not suitable for a horological application.

The aim of the invention is to provide a rivet for remedying the abovementioned drawbacks and to improve the rivets known from the prior art. In particular, the invention proposes a simple rivet that makes it possible to produce an assembly of parts by riveting, said rivet being removable without there being a risk of damaging the parts.

A rivet according to the invention is defined in claim 1.

Various embodiments of the rivet are defined in dependent claims 2 to 10.

A mechanism according to the invention is defined in claim 11.

A movement according to the invention is defined in claim 12.

A timepiece according to the invention is defined in claim 13.

A tool according to the invention is defined in claim 14.

A method for removing a riveted assembly according to the invention is defined in claim 15.

FIG. 1 is a schematic view of one embodiment of a timepiece according to the invention, comprising a rivet according to one embodiment.

FIG. 2 is a cross-sectional view along the longitudinal axis of one embodiment of a rivet according to the invention.

FIG. 3 is a top view of the embodiment of the rivet according to the invention.

FIG. 4 is a bottom view of the embodiment of the rivet according to the invention.

FIG. 5 is a cross-sectional view along the longitudinal axis of the embodiment of the rivet, the latter being in position within a mechanism.

FIG. 6 is a top view of the embodiment of the rivet, the latter being in position within a mechanism.

FIGS. 7 and 8 are cross-sectional views along the longitudinal axis of the embodiment of the rivet during two steps of a method for breaking the rivet.

Figure 1:
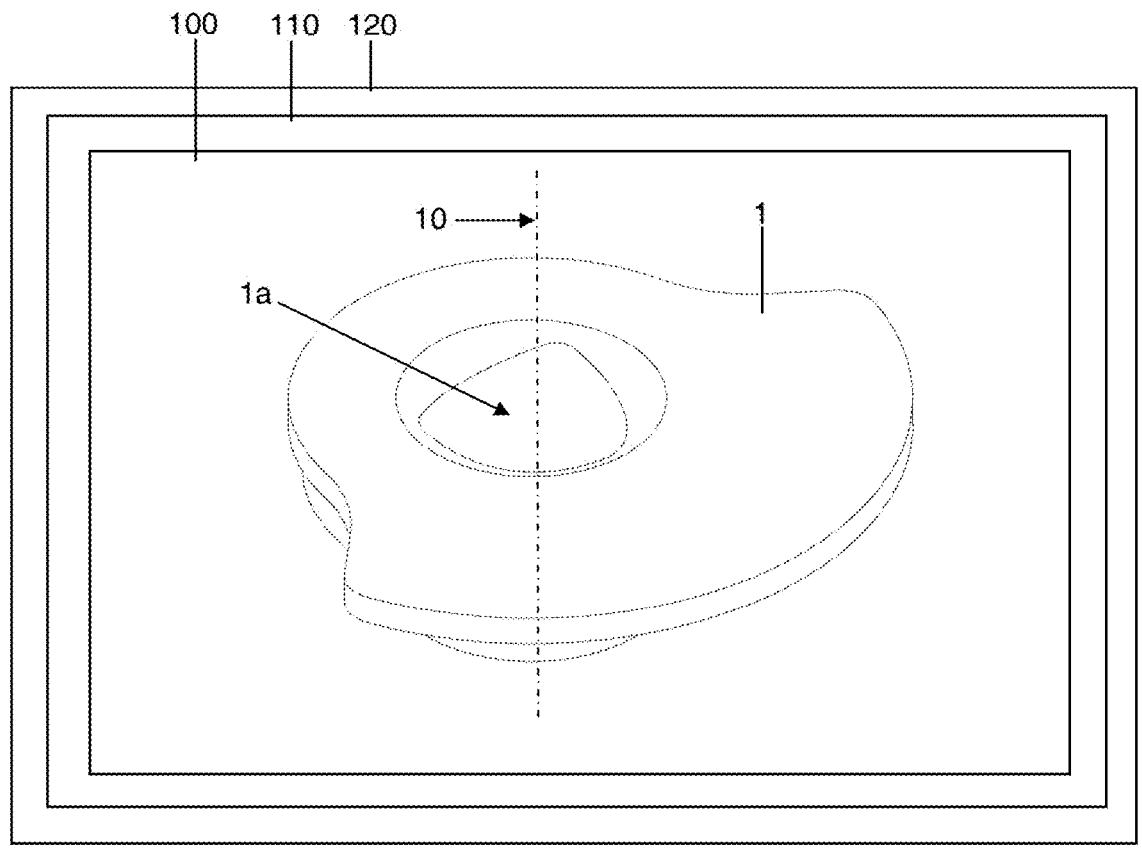
FIGS. 1 to 8 show, by way of example, one embodiment of a timepiece according to the invention and one embodiment of a rivet according to the invention.
Figure 2:
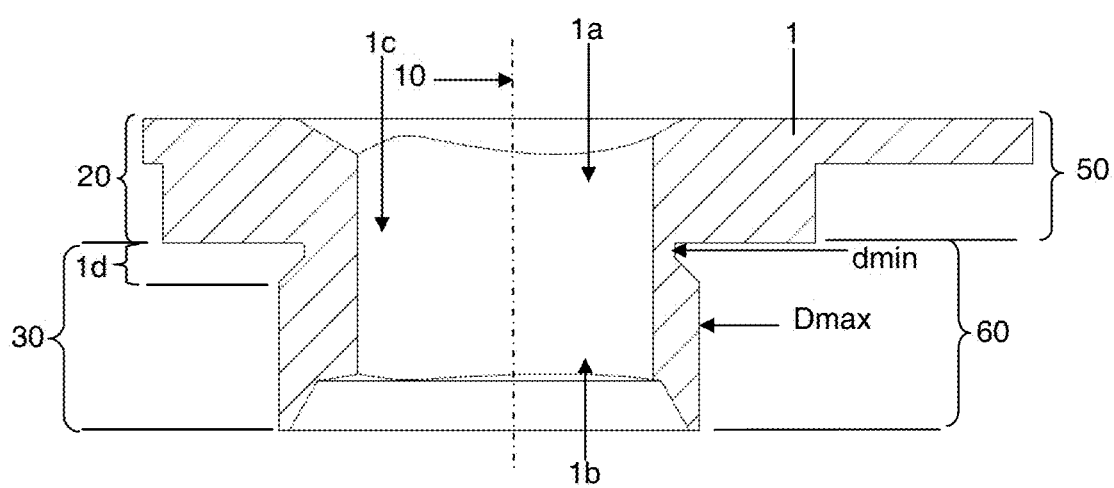

One embodiment of a timepiece 120 according to the invention is described in the following text with reference to FIG. 1. The timepiece can notably be a watch, in particular a wristwatch.

The timepiece comprises one embodiment of a timepiece movement 110 according to the invention, notably a mechanical movement. The timepiece movement comprises one embodiment of a mechanism 100 according to the invention. The mechanism comprises one embodiment of a horological rivet 1 according to the invention.

One embodiment of the rivet is described in detail with reference to FIGS. 2 to 9.

The rivet 1 comprises:
- a longitudinal axis 10;
- a first part 20, in particular a head 50;
- a second part 30, in particular a body 60, the first part comprising a first handling element 1a and the second part comprising a second handling element 1b.

Preferably, the first handling element 1a is able to mechanically stress the first part and the second handling element 1b is able to mechanically stress the second part.

Preferably, the first and second handling elements are such that they make it possible to apply mechanical actions to the first and the second part, respectively, that cause the first and second parts of the rivet to break, notably to shear, that is to say to break at the interface between the first and second parts. Advantageously, the parts break along a plane or surface perpendicular to the longitudinal axis of the rivet or substantially perpendicular to the longitudinal axis of the rivet.

In other words, the first and second handling elements form elements for setting in rotation and/or for preventing rotation that are disposed on either side of the rivet. More particularly, they are provided to allow the body of the rivet to shear under the effect of an opposite rotation of the two ends of the rivet. The shearing of the body of the rivet up to breakage thus allows the components involved in the riveted assembly to be removed without there being any risk of impairing the geometric and esthetic integrity of the components initially assembled.

Advantageously, the first handling element comprises a first hollow shaped portion 1a and/or the second handling element comprises a second hollow shaped portion 1b.

Each hollow shaped portion forms a female portion designed to cooperate with a male portion of a tool, so that the tool can drive each of the parts in rotation about the longitudinal axis or can transmit a torque about the longitudinal axis.

Further advantageously, the first hollow shaped portion 1a and the second hollow shaped portion 1b are arranged in continuation of one another so as to form one single hollow shaped portion 1c. Thus, the first and second hollow shaped portions can be defined by the same generatrix lines. Notably, these generatrices can be generatrices of a cylinder (within the mathematical meaning of the term), that is to say parallel straight lines that pass through a variable point describing a closed contour (or guide curve) in order to form a surface. The closed contour would in this case advantageously be a polygonal contour or a substantially polygonal contour. The closed contour is preferably a noncircular section. For example, it can be an elliptic or substantially elliptic contour, a polygonal or substantially polygonal contour, a triangular or substantially triangular contour or a trilobal contour or substantially trilobal contour. Thus, the first and second hollow shaped portions can be produced easily.

The generatrices are preferably parallel to the longitudinal axis or substantially parallel to the longitudinal axis of the rivet.

Figure 3:
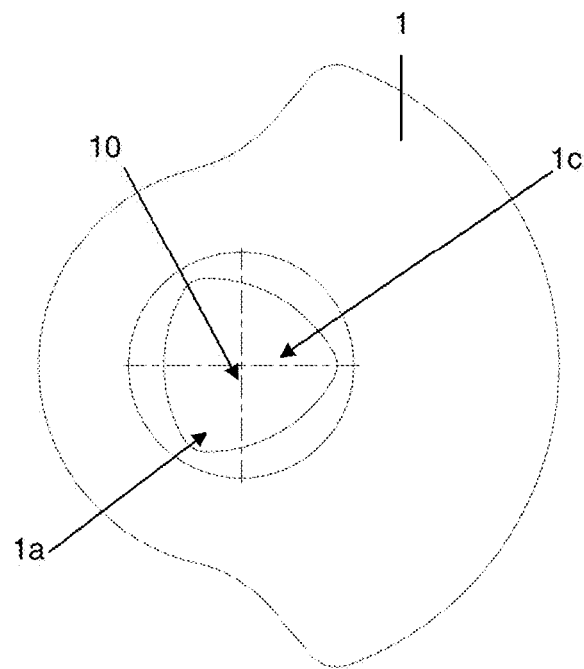
Figure 4:
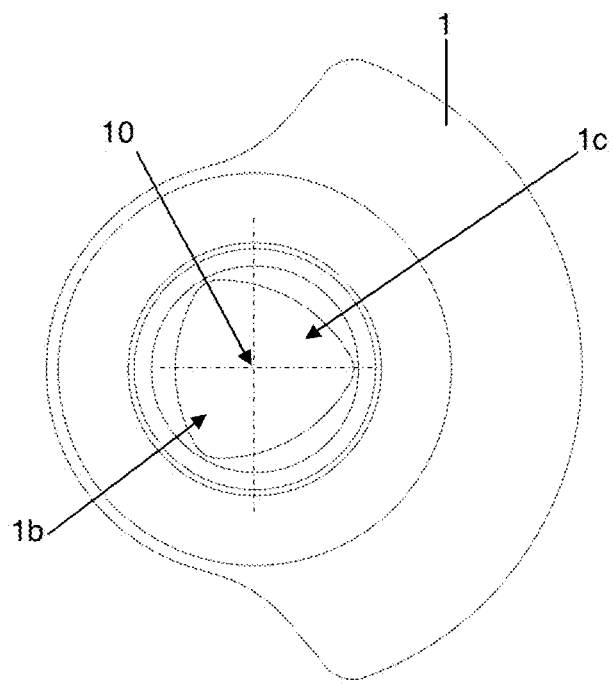

Preferably, the first hollow shaped portion has a noncircular section, in particular a polygonal section, for instance a triangular section, or a substantially polygonal section, for instance a trilobal section (as represented on FIGS. 1, 3 and 4), and/or the second hollow shaped portion has a noncircular section, in particular a polygonal section, for instance a triangular section, or a substantially polygonal section, for instance a trilobal section (as represented on FIGS. 1, 3 and 4).

The first hollow shaped portion is preferably realized in the region of the head 50 of the rivet or in the head 50 of the rivet. The second hollow shaped portion is preferably realized in the region of the body 60 of the rivet or in the body 60 of the rivet.

As an alternative to what was described above, the first hollow shaped portion may be a cruciform shaped portion or a shaped portion in the form of a slot designed to engage with a tool of the screwdriver type.

In other words, the hollow shaped portions can be substantially identical, or even identical. Preferably, the hollow shaped portions are produced in one piece, for example by way of a through-cutout which passes entirely through the rivet in a longitudinal manner. The hollow shaped portion can for example be made by plastic deformation or by machining.

Further preferably, a chamfer can be made at the ends of each of the hollow shaped portions so as to make it easier to insert the tool and thus to avoid any risk of marking the rivet.

The first handling element can be oriented along the longitudinal axis and/or the second handling element can be oriented along the longitudinal axis.

The tools that engage with the first and second handling elements can make it possible to drive the first part and/or the second part in rotation about the longitudinal axis. At the very least, the tools that engage with the first and second handling elements can transmit a torque about the longitudinal axis.

As was seen above, the first and second handling elements are advantageously disposed coaxially with the longitudinal axis.

Further advantageously, the first and second parts 20, are separated by a region 1d of lower mechanical strength, notably a region of lower mechanical strength that is oriented substantially perpendicularly to the longitudinal axis 10, in particular a region of lower mechanical shear strength, and is situated at the first part/second part interface.

The interface between the first and second parts, and in particular the region of lower mechanical strength, can be situated at the head/body interface, as is the case in the embodiment shown in FIGS. 1 to 8. However, as an alternative, the interface between the first and second parts, and in particular the region of lower mechanical strength, can be situated somewhere other than the head/body interface. In this case, the first part 20 comprises the head 50 and a first portion of the body 60 and the second part 30 comprises a second portion of the body 60.

The region 1d of lower mechanical strength may comprise a first groove, notably a first annular groove, in particular an external annular groove, as in the embodiment shown and/or a second groove, notably a second annular groove, in particular an internal annular groove.

The external groove may comprise a bottom diameter (dmin) less than 0.9 times, or even less than 0.85 times, or even less than 0.8 times the maximum diameter (Dmax) of the second part, in particular of the body.

The internal groove may comprise a bottom diameter greater than 0.8 times, or even greater than 0.85 times, or even greater than 0.9 times the maximum diameter (Dmax) of the body.

Figure 9:
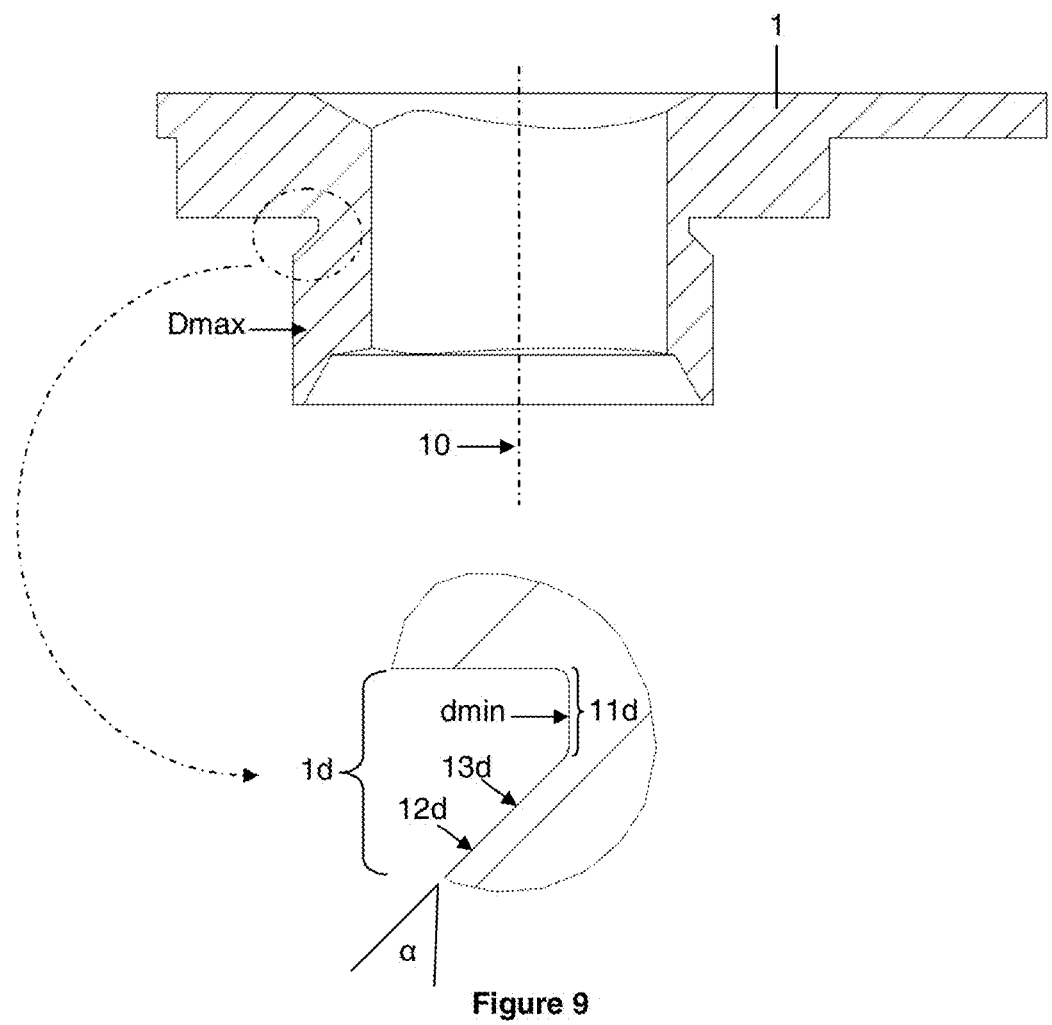
FIG. 9 is a partial cross-sectional view of the rivet in the region of a groove.

The internal groove and/or external groove has/have for example a bottom width 11d, measured along the longitudinal axis, of between 0.03 mm and 0.07 mm, notably 0.05 mm. As shown in FIG. 9, one or more sidewalls 12d of the internal groove and/or external groove form(s) a chamfer 13d having an angle α, for example a chamfer of 60° or 45° relative to the longitudinal axis 10, extending from the bottom of the groove to the outside of the groove.

Throughout this document, a "groove" should be understood as being any local narrowing in the section of at least one portion of the rivet, in particular any notable local reduction in the diameter of a portion of the body of the rivet.

It should be noted that the region of lower mechanical strength can be formed by any form of section that locally weakens the rivet. Alternatively, the region of lower mechanical strength can be implemented by one or more flats produced at the body/head interface or on a portion of the body of the rivet.

In particular, the region of lower mechanical strength can comprise a first section, notably a first section along a plane perpendicular to the longitudinal axis, the area of which is less than 2 times, or even less than 3 times, or even less than 4 times the area of a second section of the body 60 of the rivet, notably a second section along a plane perpendicular to the longitudinal axis.

Finally, a region of lower mechanical strength can be formed at the head/body interface with a very small local narrowing in the section of the body of the rivet, taking the form of a pit, or without a local narrowing in the section of the body of the rivet. Specifically, manufacturing methods can generate regions of stress concentration in the material at such interfaces. It follows that these regions can have reduced mechanical strength.

Advantageously, the rivet has mechanical shear strength of less than 0.5 mNm, or even less than 0.3 mNm at the first part/second part interface.

A rivet according to the invention can be used in several horological applications. Notably, the rivet can comprise a radial projection 1f or a post or an eccentric or a wheel or a pinion. Thus, the rivet can for example be in the form of a post attached to a movement blank, said post not being movable relative to the latter. This post may in particular act as a pivot axis of a timepiece mobile. It can also act as an eccentric, notably an eccentric for adjusting the position in the plane of a timepiece element such as a rocker. The rivet can also be in the form of a one-piece or multipiece wheel or a pinion so as to allow the assembly of a toothed mobile.

The invention also relates to a tool 4a; 4b, preferably a male tool, for removing a rivet 1 as described above. Such a tool comprises a shaped portion 41a; 41b that is intended to be fitted in a handling element of the rivet.

Preferably, shoulders 42a and 42b can be provided at the heads of the tools so as to limit the penetration of the tools into the handling elements. Thus, each tool remains advantageously located at the first part or the second part, without any risk of a tool inserted too deeply into a handling element extending through the first and second parts. Alternatively, one or two stops could be provided in the hole 1c in order to avoid this problem.

Figure 7:
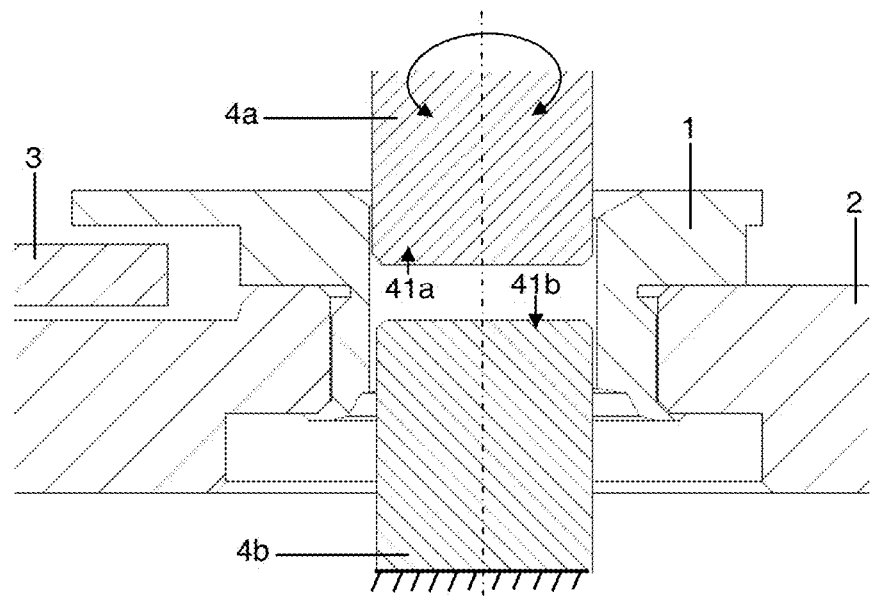
Figure 8:
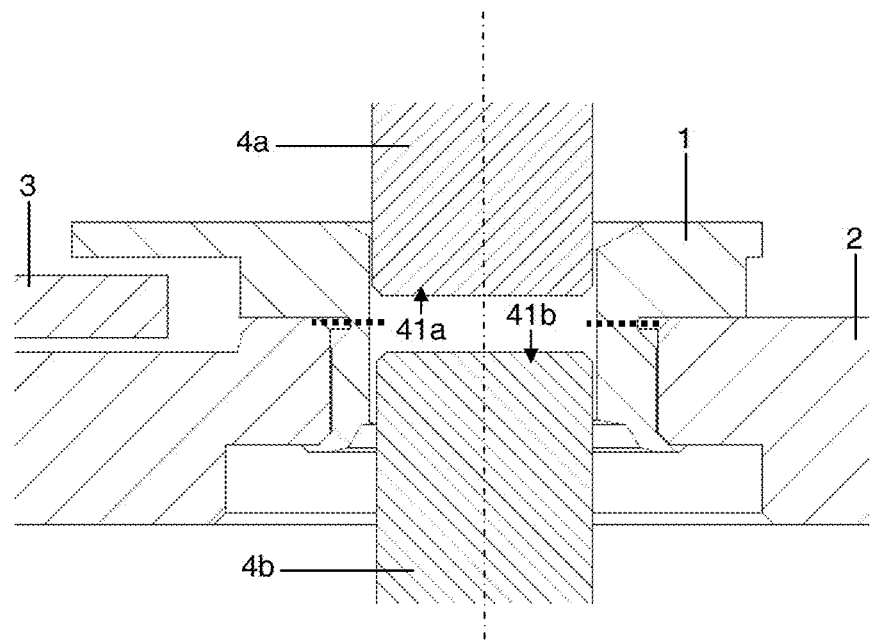

The invention also relates to a method for removing a riveted assembly, that is to say an assembly of parts produced with the aid of a rivet as described above. The method is illustrated in FIGS. 7 and 8, the rivet not yet being broken in FIG. 7 and the rivet being broken in FIG. 8.

The method comprises the following steps of:
  taking hold of the first part of the rivet, notably by introducing a tool into the first handling element,
  taking hold of the second part of the rivet, notably by introducing a tool into the second handling element,
  exerting mechanical stress of the first part on the second part, notably mechanical shear stress of the first part on the second part relative to the longitudinal axis (10), so as to break the first and second parts of the rivet.

Advantageously, a first mechanical action, notably a first rotary torque about the longitudinal axis, is exerted on the first part and a second mechanical action, notably a second rotary torque about the longitudinal axis, is exerted on the second part. Preferably, the first mechanical action and the second mechanical action are in opposite directions. Alternatively, the first mechanical action could be a first rotary torque about an axis perpendicular or substantially perpendicular to the longitudinal axis 10 in FIG. 7 and the second mechanical action could be a second rotary torque about an axis perpendicular or substantially perpendicular to the longitudinal axis 10 in FIG. 7.

The first mechanical action is exerted with the aid of a first tool that engages with the first handling element and the second mechanical action is exerted with the aid of a second tool that engages with the second handling element.

In the detail of the method, in a first step, the heads 41a and 41b of a tool 4a; 4b are each intended to be inserted with play, or even with very little play, within the hollow shaped portions 1a, 1b, respectively, of the rivet. To this end, the heads 41a, 41b have a geometry substantially complementary to those of the hollow shaped portions 1a, 1b. In a second step, the head 41a is set in rotation about the axis 10 in one or the other of the two directions of rotation so as to drive the first part 20 of the rivet in rotation, while the head 41b prevents the second part 30 of the rivet from rotating, as shown in FIG. 7. The driving of the first part is represented by a double arrow in FIG. 7. The immobilization of the second part is represented by a mass symbol in FIG. 7. Alternatively, the head 41b can also be set in rotation about the axis 10 so as to drive the second part of the rivet in rotation in the opposite direction to the first part. Alternatively again, the head 41b can be set in rotation about the axis 10 in one or the other of the two directions of rotation so as to drive the second part 30 of the rivet, while the head 41a prevents the first part of the rivet from rotating. This second step results in the first and second parts of the rivet being disconnected by breaking at their interface, as illustrated in FIG. 8. The first and second parts can then be removed and the parts of the assembly can be separated.

In the embodiment shown, the rivet takes the form of a component provided to limit axial shaking of a timepiece mobile 3. The removal of the mobile 3 requires the rotation of the rivet 1 about its axis 10. The torque necessary to rotate the rivet is at least 3 mNm, or even 10 mNm, or even 20 mNm. The rivet can be driven in rotation by way of a tool provided with a head shaped so as to engage with the rivet. Preferably, this head has a geometry identical or substantially identical to that of the head 41a or 41b of the tool 4a; 4b.

Preferably, the first handling or driving element is designed so as to make it possible to apply to the first part, notably via a tool, a first torque in at least one first direction about the longitudinal axis of the rivet, and the second handling or driving element is designed so as to make it possible to apply to the second part, notably via a tool, a second torque in at least one second direction about the longitudinal axis of the rivet, the first and second directions being opposed to one another.

Advantageously, each handling element is designed so as to make it possible to apply to one part, notably via a tool, a torque in the first direction or in the second direction about the longitudinal axis of the rivet. Thus, during removal, the horologist has the choice of the direction of application of the mechanical torque necessary to break the rivet.

The rivet according to the invention also makes it possible to ensure all the usual functions of a conventional rivet. It should be noted that the first handling element and/or the second handling element can also be used to orient the rivet in rotation after it has been positioned.

Figure 5:
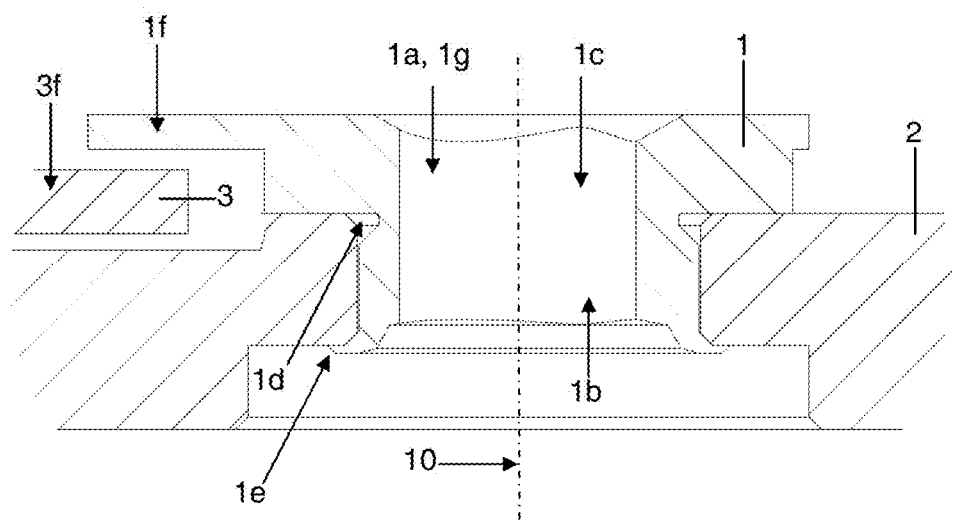
Figure 6:
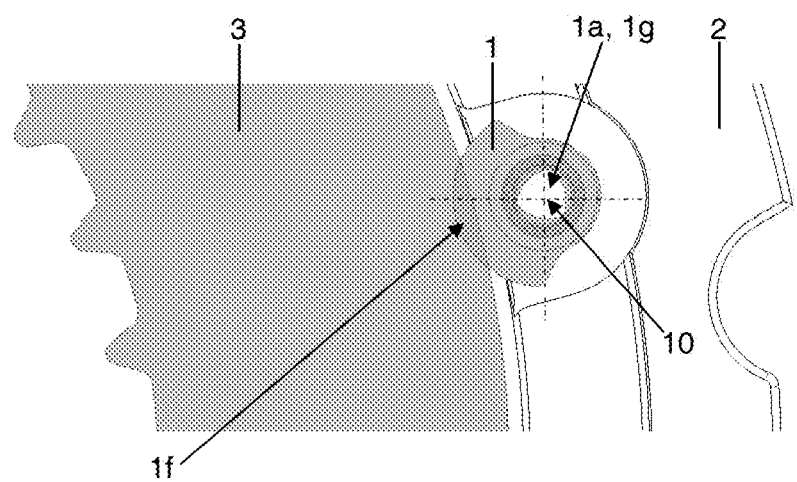

FIGS. 5 and 6 illustrate an assembly in which the rivet 1 is secured conventionally to a movement blank 2 via a rivet seam 1e. The rivet 1 has in this case the form of a component intended to limit the axial shaking of a timepiece mobile 3. To this end, the rivet is provided with a projection 1f substantially parallel to the plane of the movement blank, said projection 1f being intended to engage with a surface 3f of the timepiece mobile. The rivet also comprises an hollow shaped portion 1g which is intended to be actuated by a suitable tool so as to make it possible to rotate the rivet about its longitudinal axis 10 and thus to move the projection 1f with respect to the mobile 3 and thus to allow the mobile 3 to be removed from the movement blank 2.

Preferably, the geometry of the hollow shaped portion 1g, provided to allow the rivet to be driven in rotation, is coincident with that of the hollow shaped portion 1a which is provided to allow the rivet to be removed.

As seen above, the rivet according to the invention makes it possible to meet a need for secure removal of a riveted assembly, while preserving the acknowledged assembly properties of the conventional rivet. The rivet according to the invention proves to be particularly advantageous in terms of its simplicity of implementation. This is reflected in a particular shaped portion of a rivet which is distinguished by handling elements for stressing two parts of the rivet and, possibly, a region of lower mechanical strength at the interface between the first and second parts.

The invention claimed is:

1. A rivet, comprising:
   a rivet body having a longitudinal axis;
   a first part comprising a head of the rivet having a first dimension transverse to the longitudinal axis, and projecting radially from the rivet body;
   a second part comprising a plastically deformable portion of the rivet having a second dimension transverse to the longitudinal axis and smaller than the first transverse dimension before deformation, and adapted to be deformed to have a third dimension transverse to the longitudinal axis and larger than the second transverse dimension, so as to form a rivet seam projecting radially from the rivet body,
   the first part being connected to the second part by a breakage zone,
   the first part comprising a first handling element that is able to mechanically stress the first part, and the second part comprising a second handling element that is able to mechanically stress the second part, the first handling element and the second handling element being so that the first handling element and second handling element make it possible to apply mechanical actions to the first part and the second part, respectively, that cause the first part and the second part of the rivet to break at the breakage zone,
   wherein
   (i) the first handling element comprises a first hollow shaped portion, wherein the first hollow shape has a noncircular section in a plane perpendicular to the longitudinal axis,
   (ii) the second handling element comprises a second hollow shaped portion, wherein the second hollow shape has a noncircular section in a plane perpendicular to the longitudinal axis, and
   (iii) the first hollow shaped portion and the second hollow shaped portion are arranged in continuation of one another so as to form one single hollow shaped portion.

2. The rivet as claimed in claim 1, wherein at least one of (i) the first handling element is oriented along the longitudinal axis and (ii) the second handling element is oriented along the longitudinal axis.

3. The rivet as claimed in claim 1, wherein the first handling element and second handling element are disposed coaxially with the longitudinal axis.

4. The rivet as claimed in claim 1, wherein the first part and the second part are separated by a region of lower mechanical strength that is oriented substantially perpendicularly to the longitudinal axis and is situated at an interface of the first part and the second part.

5. The rivet as claimed in claim 4, wherein the region of lower mechanical strength comprises a groove.

6. The rivet as claimed in claim 5, wherein at least one of (i) the groove comprises a bottom diameter less than 0.9 times a maximum diameter of the second part, (ii) the groove has a bottom width, measured along the longitudinal axis, of between 0.03 mm and 0.07 mm, and (iii) one or more sidewalls of the groove have or form a chamfer extending from the bottom of the groove to an outside of the groove.

7. The rivet as claimed in claim 5, wherein at least one of (i) the groove comprises a bottom diameter less than 0.85 times the maximum diameter of the second part, (ii) the groove has a bottom width, measured along the longitudinal axis, of 0.05 mm, and (iii) one or more sidewalls of the groove has/have or form(s) a chamfer having an angle (a) of 45° or 60°, and extending from the bottom of the groove to the outside of the groove.

8. The rivet as claimed in claim 4, wherein the region separating the first and second parts is a region of lower mechanical shear strength.

9. The rivet as claimed in claim 4, wherein the region of lower mechanical strength comprises an annular groove.

10. The rivet as claimed in claim 1, wherein said rivet comprises a radial projection or a post or an eccentric or a wheel or a pinion.

11. A timepiece mechanism comprising a rivet as claimed in claim 1.

12. A timepiece movement comprising a rivet as claimed in claim 1.

13. A timepiece, comprising a rivet as claimed in claim 1.

14. A tool, for removing a rivet as claimed in claim 1, the tool comprising a shaped portion that is intended to be fitted in a handling element of the rivet.

15. A method for removing an assembly including a rivet as claimed in claim 1, comprising:
   taking hold of the first part of the rivet,
   taking hold of the second part of the rivet,
   exerting mechanical stress of the first part on the second part, so as to break the first part and the second part of the rivet.

16. The rivet as claimed in claim 1, wherein the first hollow shaped portion has a polygonal section.

17. The rivet as claimed in claim 1, wherein the second hollow shaped portion has a polygonal section.

18. The rivet as claimed in claim 1, wherein the first and second hollow shapes are simultaneously accessible by respective tools.

19. The rivet as claimed in claim 1, wherein the first and second hollow shapes open on opposite sides of the breakage zone of the rivet.

20. The rivet as claimed in claim 1, wherein the first and second hollow shapes form a through-cutout which passes entirely through the rivet in a longitudinal manner.

21. The rivet as claimed in claim 1, wherein the first and second hollow shapes have a same contour in a plane transverse to the longitudinal axis.

* * * * *